United States Patent
Jeong et al.

(10) Patent No.: US 9,184,477 B2
(45) Date of Patent: Nov. 10, 2015

(54) BATTERY PACK OF EXCELLENT COOLING EFFICIENCY

(71) Applicant: LG CHEM, LTD., Seoul (KR)

(72) Inventors: SangYoon Jeong, Daejeon (KR); DalMo Kang, Daejeon (KR); Jong Moon Yoon, Daejeon (KR); Chae Ho Chung, Daejeon (KR); MinJung Kim, Suwon-si (KR)

(73) Assignee: LG CHEM, LTD., Seoul (KR)

( * ) Notice: Subject to any disclaimer, the term of this patent is extended or adjusted under 35 U.S.C. 154(b) by 65 days.

(21) Appl. No.: 13/861,032

(22) Filed: Apr. 11, 2013

(65) Prior Publication Data

US 2013/0230753 A1 Sep. 5, 2013

Related U.S. Application Data

(63) Continuation of application No. PCT/KR2011/008303, filed on Nov. 2, 2011.

(30) Foreign Application Priority Data

Nov. 18, 2010 (KR) .................. 10-2010-0114777

(51) Int. Cl.
  *H01M 2/12* (2006.01)
  *H01M 6/46* (2006.01)
  (Continued)

(52) U.S. Cl.
  CPC ........ *H01M 10/5004* (2013.01); *H01M 2/1077* (2013.01); *H01M 10/613* (2013.01);
  (Continued)

(58) Field of Classification Search
  CPC .................. H01M 10/5004; H01M 10/5061; H01M 2220/20
  USPC .................. 429/83, 120, 156, 159
  See application file for complete search history.

(56) References Cited

U.S. PATENT DOCUMENTS

2004/0207368 A1* 10/2004 Kimoto et al. ............... 320/150
2006/0090492 A1 5/2006 Ahn et al.
(Continued)

FOREIGN PATENT DOCUMENTS

CN 101027814 A 8/2007
DE 198 28 252 A1 12/1999
(Continued)

OTHER PUBLICATIONS

International Search Report issued in PCT/KR2011/008303, mailed on Jun. 1, 2012.
(Continued)

*Primary Examiner* — Sean P Cullen
(74) *Attorney, Agent, or Firm* — Birch, Stewart, Kolasch & Birch, LLP

(57) ABSTRACT

Disclosed is a battery pack including battery modules arranged in two or more rows, each of the battery modules including a plurality of battery cells or unit modules, each of which has two or more battery cells mounted therein, stacked in an upright or upside-down fashion, wherein the battery modules are individually mounted in pack cases, the pack cases are provided at upper parts and lower parts thereof with coolant inlet ports and coolant outlet ports such that a coolant to cool the battery cells flows to one side to the other side of the battery modules in a direction perpendicular to the stacked direction of the battery cells or the unit modules, the pack cases are further provided with flow spaces ('coolant introduction parts').

12 Claims, 5 Drawing Sheets

(51) Int. Cl.
*H01M 10/625* (2014.01)
*H01M 10/647* (2014.01)
*H01M 10/6563* (2014.01)
*H01M 10/613* (2014.01)
*H01M 2/10* (2006.01)
*H01M 10/6566* (2014.01)
*H01M 10/656* (2014.01)

(52) U.S. Cl.
CPC .......... *H01M10/647* (2013.01); *H01M 10/656* (2013.01); *H01M 10/6563* (2013.01); *H01M 10/6566* (2013.01); *H01M 2220/20* (2013.01)

(56) References Cited

U.S. PATENT DOCUMENTS

| | | | |
|---|---|---|---|
| 2010/0059299 A1 | 3/2010 | Hoermandinger et al. | |
| 2010/0089675 A1* | 4/2010 | Nagata et al. | 180/68.5 |
| 2011/0070474 A1* | 3/2011 | Lee et al. | 429/120 |
| 2011/0177367 A1 | 7/2011 | Chung et al. | |

FOREIGN PATENT DOCUMENTS

| | | |
|---|---|---|
| EP | 2 631 985 A2 | 8/2013 |
| JP | 2008-513949 A | 5/2008 |
| JP | 2010-92854 A | 4/2010 |
| KR | 10-2006-0036694 A | 5/2006 |
| KR | 10-2006-0037630 A | 5/2006 |
| KR | 10-2010-0012018 A | 2/2010 |
| WO | WO 2005/074054 A1 | 8/2005 |
| WO | WO 2007/097594 A1 | 8/2007 |
| WO | WO 2009/002096 A1 | 12/2008 |
| WO | WO 2010013902 A2 * | 2/2010 |
| WO | WO 2010114311 A2 * | 10/2010 |
| WO | WO 2010148224 A2 * | 12/2010 |
| WO | WO 2011/021843 A2 | 2/2011 |

OTHER PUBLICATIONS

Chinese Office Action with English translation mailed Dec. 31, 2014.
European Office Action Mailed Feb. 4, 2015.

\* cited by examiner

BATTERY PACK OF EXCELLENT COOLING EFFICIENCY

CROSS REFERENCE TO RELATED APPLICATIONS

This application is a Continuation of PCT International Application No. PCT/KR2011/008303 filed on Nov. 2, 2011, which claims priority under 35 U.S.C. §119 (a) to Patent Application No. 10-2010-0114777 filed in the Republic of Korea on Nov. 18, 2010, all of which are hereby expressly incorporated by reference into the present application.

TECHNICAL FIELD

The present invention relates to a battery pack exhibiting high cooling efficiency, and, more particularly, to a battery pack including battery modules arranged in two or more rows, each of the battery modules including a plurality of battery cells or unit modules, each of which has two or more battery cells mounted therein, stacked in an upright or upside-down fashion, wherein the battery modules are individually mounted in pack cases, the pack cases are provided at upper parts and lower parts thereof with coolant inlet ports and coolant outlet ports such that a coolant to cool the battery cells flows to one side to the other side of the battery modules in a direction perpendicular to the stacked direction of the battery cells or the unit modules, the pack cases are further provided with flow spaces ('coolant introduction parts') extending from the coolant inlet ports to the battery modules, and flow spaces ('coolant discharge parts') extending from the battery modules to the coolant outlet ports, and the coolant inlet ports diverge from a coolant introduction duct such that the coolant inlet ports are connected to the respective pack cases while the coolant outlet ports extend from the respective pack cases such that the coolant outlet ports are connected to a coolant discharge duct.

BACKGROUND ART

Recently, a secondary battery, which can be charged and discharged, has been widely used as an energy source for wireless mobile devices. Also, the secondary battery has attracted considerable attention as a power source for electric vehicles (EV), hybrid electric vehicles (HEV), and plug-in hybrid electric vehicles (Plug-in HEV), which have been developed to solve problems, such as air pollution, caused by existing gasoline and diesel vehicles using fossil fuels.

Small-sized mobile devices use one or several battery cells for each device. On the other hand, middle or large-sized devices, such as vehicles, use a battery pack having a plurality of battery cells electrically connected to each other because high power and large capacity are necessary for the middle or large-sized devices.

Preferably, a battery pack is manufactured so as to have as small a size and weight as possible. For this reason, a prismatic battery or a pouch-shaped battery, which can be stacked with high integration and has a small weight to capacity ratio, is usually used as a battery cell of the battery pack. In particular, much interest is currently focused on such a pouch-shaped battery, which uses an aluminum laminate sheet as a sheathing member, because the pouch-shaped battery is lightweight, the manufacturing cost of the pouch-shaped battery is low, and it is easy to modify the shape of the pouch-shaped battery.

In order for a battery pack to provide power and capacity required by a specific apparatus or device, it is necessary for the middle or large-sized battery module to be configured to have a structure in which a plurality of battery cells is electrically connected in series to each other, and the battery cells are stable against external force. In addition, it is necessary for the battery pack to be configured to effectively use a space of a specific apparatus or device such that a dead space of the apparatus or device is minimized when the battery pack is mounted in the apparatus or device.

Also, battery cells constituting a middle or large-sized battery module are secondary batteries which can be charged and discharged. Consequently, a large amount of heat is generated from the high power, large capacity secondary batteries during the charge and discharge of the batteries. If the heat, generated from the unit cells during the charge and discharge of the unit cells, is not effectively removed, the heat accumulates in the respective unit cells with the result that the deterioration of the unit cells is accelerated. According to circumstances, the unit cells may catch fire or explode. For this reason, a cooling system is needed in a battery pack for vehicles, which is a high power, large capacity battery, to cool battery cells mounted in the battery pack.

In a battery pack including a plurality of battery cells, on the other hand, the deterioration in performance of some battery cells leads to the deterioration in performance of the entire battery pack. One of the main factors causing the non-uniformity in performance is the non-uniformity of cooling between the battery cells. For this reason, it is necessary to provide a structure to optimize the shape of a flow channel, thereby minimizing temperature deviation between the battery cells during the flow of a coolant.

Consequently, there is a high necessity for a technology to fundamentally solve the above-mentioned problems.

DISCLOSURE

Technical Problem

Therefore, the present invention has been made to solve the above problems and other technical problems that have yet to be resolved.

As a result of a variety of extensive and intensive studies and experiments on a battery pack, the inventors of the present application have developed a battery pack having a specific structure and found that the battery pack exhibits high cooling efficiency and high space efficiency. The present invention has been completed based on these findings.

Technical Solution

In accordance with one aspect of the present invention, the above and other objects can be accomplished by the provision of a battery pack including battery modules arranged in two or more rows, each of the battery modules including a plurality of battery cells or unit modules, each of which has two or more battery cells mounted therein, stacked in an upright or upside-down fashion, wherein the battery modules are individually mounted in pack cases, the pack cases are provided at upper parts and lower parts thereof with coolant inlet ports and coolant outlet ports such that a coolant to cool the battery cells flows to one side to the other side of the battery modules in a direction perpendicular to the stacked direction of the battery cells or the unit modules, the pack cases are further provided with flow spaces ('coolant introduction parts') extending from the coolant inlet ports to the battery modules, and flow spaces ('coolant discharge parts') extending from the battery modules to the coolant outlet ports, and the coolant inlet ports diverge from a coolant introduction duct such that the coolant inlet ports are connected to the respective pack cases while the coolant outlet ports extend from the respective pack cases such that the coolant outlet ports are connected to a coolant discharge duct.

Generally, deviation in cooling efficiency may be generated in the battery pack due to the difference in cooling efficiency between the battery cells or the unit modules located at the coolant inlet ports and the battery cells or the unit modules located at the battery pack opposite to the coolant inlet ports. The deviation in cooling efficiency may be increased as the length of the battery cells or the unit modules in the stacked direction thereof is increased, i.e. the flow distance of the coolant in the coolant introduction parts is increased.

Also, if one edge of the battery pack is excessively lengthened within the same volume range of the battery pack, space efficiency of a device, in which the battery pack is mounted, may be lowered.

In the battery pack according to the present invention, the battery modules may be arranged in two or more rows. Consequently, the battery pack has a more compact structure than a battery pack having battery modules arranged in one row; thereby reducing a dead space and thus maximizing space efficiency. Also, temperature deviation between the battery modules is little.

Each of the unit modules may be configured to have a structure including two or more battery cells, electrode terminals of which are connected in series to each other, and a pair of module housings coupled to cover outsides of the battery cells excluding the electrode terminals of the battery cells.

The module housings restrain the repetitive expansion and contraction change of the battery cells during the charge and discharge of the battery cells, while protecting the battery cells having low mechanical strength, thereby preventing separation between sealed regions of the battery cells.

The structure of the module housings is not particularly restricted so long as the battery cells are mounted in the module housings. In an unlimited example, the module housings may have an internal structure corresponding to the external shape of the battery cell stack. In particular, the module housings may be coupled to each other in an assembly type fastening fashion without using additional fastening members.

In a preferred example, each of the unit modules may be configured to have a structure in which two battery cells are mounted in module housings made of a metallic material.

The battery cells are secondary batteries having a small thickness and a relatively large width and length such that the total size of the secondary batteries is minimized when the secondary batteries are stacked to construct a battery module. In a preferred example, each battery cell may be a secondary battery configured to have a structure in which an electrode assembly is mounted in a battery case made of a laminate sheet including a resin layer and a metal layer, and electrode terminals protrude from upper and lower ends of the battery case. Specifically, each battery cell may be configured to have a structure in which an electrode assembly is mounted in a pouch-shaped battery case made of an aluminum laminate sheet. The secondary battery with the above-stated construction may be referred to as a pouch-shaped battery cell.

A cell case of the pouch-shaped battery cell may be configured to have various structures. For example, the case of the pouch-shaped battery cell may be configured to have a structure in which an electrode assembly is received in a receiving part formed at an upper inner surface and/or a lower inner surface of a two-unit member, and the upper and lower contact regions are sealed. A pouch-shaped battery cell with the above-described construction is disclosed in PCT International Application No. PCT/KR2004/003312, which has been filed in the name of the applicant of the present patent application. The disclosure of the above-mentioned patent application is hereby incorporated by reference as if fully set forth herein.

The electrode assembly includes cathodes and anodes, by which the charge and the discharge of the battery are possible. The electrode assembly may be configured to have a structure in which cathodes and anodes are stacked while separators are disposed respectively between the cathodes and the anodes. For example, the electrode assembly may be configured to have a jelly-roll type structure, a stacked type structure, or a stacked/folded type structure. The cathodes and the anodes of the electrode assembly may be configured such that electrode tabs of the cathodes and electrode tabs of the anodes directly protrude outward from the battery. Alternatively, the cathodes and the anodes of the electrode assembly may be configured such that the electrode tabs of the cathodes and the electrode tabs of the anodes are connected to additional leads, and the leads protrude outward from the battery.

The battery cells may be connected in series and/or parallel to each other in one battery module, or the battery cells of one battery module may be connected in series and/or parallel to the battery cells of another battery module. In a preferred example, a plurality of unit modules may be manufactured by coupling electrode terminals of the battery cells to each other in a state in which the battery cells are arranged in series in the longitudinal direction such that the electrode terminals of the battery cells are successively adjacent to each other, bending two or more battery cells such that the battery cells are stacked, and covering a predetermined number of stacked battery cells using module housings.

The coupling between the electrode terminals may be achieved in various manners, such as welding, soldering, and mechanical coupling. Preferably, the coupling between the electrode terminals is achieved by welding.

Of the outer edge sealed portion of the battery cell, the side sealed portion may be bent so as to approximately coincide with the inner shape of the module housings. As a result, space utilization is improved, and therefore, it is possible to manufacture a compact battery module.

In the structure in which the electrode terminals protrude outward from the upper and lower ends of the battery cell as described above, if an odd number of battery cells are connected in series to each other, the electrode terminals are located at the opposite ends of the battery cells in each unit module with the result that the subsequent process is not easily performed. For this reason, it is preferable to connect an even number of battery cells in series to each other. Also, in a case in which three or more battery cells constitute a unit module, the other battery cell(s) excluding the outermost battery cells is not directly fixed to the module housings with the result that the battery cell(s) may cause a problem due to vibration.

Also, the module housings may be provided at the outer edges thereof with protrusions to provide flow channels when the module housings are stacked. When the unit modules are stacked, the protrusions come into contact with each other to form flow channels, through which a coolant flows, between the protrusions.

In another preferred example, portions of the module housings corresponding to the portions of the battery cells from which the electrodes protrude outward may be lower than the remaining portions of the module housings to fix the portions of the battery cells from which the electrodes protrude outward.

The battery cells are not particularly restricted so long as the battery cells are secondary batteries which can be charged and discharged. Preferably, the battery cells are lithium secondary batteries, each of which has a large power or capacity to weight ratio.

Preferably, the battery modules are arranged in two or more rows in the stacked direction of the battery cells or the unit modules.

Generally, a coolant is introduced in the stacked direction of the battery cells or the unit modules, passes through between the battery cells or the unit modules, and is then discharged. When the battery modules are arranged in two or more rows in the stacked direction of the battery cells or the unit modules as described above, therefore, the length of the coolant introduction parts is decreased, thereby improving cooling efficiency and reducing temperature deviation between the battery cells or the unit modules of the same battery modules.

According to the present invention, the coolant inlet ports may diverge from the coolant introduction duct at an angle of 60 to 120 degrees to a direction in which the coolant flows in the coolant introduction duct.

When the coolant inlet ports are configured to diverge from the coolant introduction duct within the above angle range, it is possible to constitute a compact battery pack. For this reason, the coolant inlet ports preferably diverge from the coolant introduction duct at an angle of 90 degrees to the direction in which the coolant flows in the coolant introduction duct.

The coolant discharge duct may be formed at a place at which the coolant outlet ports are connected to each other such that the coolant discharge duct extends upward.

In a case in which the coolant discharge duct extends upward, the coolant discharge duct may be formed along the sides of the battery modules, thereby improving overall space efficiency of the battery pack. On the other hand, in a case in which the coolant discharge duct extends downward, the battery pack protrudes downward by the length of the coolant discharge duct, which is not preferable. Even in a case in which the coolant discharge duct extends in the stacked direction of the battery cells, the battery pack protrudes extends in the stacked direction of the battery cells by the length of the coolant discharge duct, which is also not preferable.

Suction fans to generate driving force, by which the coolant, introduced through the coolant inlet ports, passes the battery modules and is discharged through the coolant outlet ports, may be mounted in the respective coolant outlet ports.

If blow fans are mounted in the respective coolant inlet ports, great driving noise of the fans may be generated in a device in which the battery pack is installed. In a case in which the driving force is generated by the suction fans as described above, on the other hand, uniform flow rate of the coolant is supplied to the respective battery modules even when the coolant inlet ports diverge from the coolant introduction duct at a predetermined angle to a direction in which the coolant flows in the coolant introduction duct.

In a preferred example, the suction fans may be mounted at higher positions than upper ends of the battery modules to minimize impact to the battery modules when external force is applied to the battery pack in a lateral direction of the battery pack.

That is, the suction fans are mounted at higher positions than the upper end of the battery module assembly, and therefore, impact to the battery module assembly is minimized when external force is applied to the battery pack in the lateral direction of the battery pack, thereby securing safety of battery pack.

Also, the suction fans are connected to the coolant discharge ducts extending upward from the coolant output ports along the side of the battery module assembly. Consequently, the speed at which the coolant is introduced into the coolant introduction parts, passes the battery modules, and is discharged through the coolant output ports is increased, thereby improving cooling efficiency of the battery cells or the unit modules.

The upper end insides of the coolant introduction parts may have inclined planes inclined with respect to the top of the battery cell stack or the unit module stack such that the coolant introduction parts are widened from ends of the pack case opposite to the coolant inlet ports to the coolant inlet ports.

In a case in which the upper end insides of the coolant introduction parts are parallel to the top of the battery cell stack or the unit module stack, flow rate of the coolant at the flow channels adjacent to the coolant inlet ports is greatly reduced with the result that temperature deviation between the battery cells or the unit modules is increased.

On the other hand, in a case in which the upper end insides of the coolant introduction parts have inclined planes as described above, it is possible to reduce such temperature deviation between the battery cells or the unit modules, thereby preventing lowering in performance of the battery pack.

In a preferred example, each of the inclined planes may have an inclination angle of 3 to 8 degrees.

If each of the inclined planes has an inclination angle of less than 3 degrees, it is not possible to efficiently reduce temperature deviation between the battery cells or the unit modules. On the other hand, if each of the inclined planes has an inclination angle of greater than 8 degrees, the height of each of the coolant inlet ports is increased with the result that it is not possible to manufacture a compact battery pack. In addition, as the sectional area of each of the coolant inlet ports is increased, the velocity of the coolant may be decreased, which is not preferable.

Also, in a case in which each of the coolant inlet ports is inclined at an angle greater than that of the upper end inside of each of the coolant introduction parts, it is possible to further reduce the above temperature deviation between the battery cells or the unit modules. Preferably, the coolant inlet ports are inclined at an angle of 20 to 80 degrees.

The width of each of the coolant inlet ports greatly affects the temperature deviation between the unit cells except in the case in which the upper end insides of the coolant introduction parts are configured to have the specific inclined structure as previously described.

When each of the coolant inlet ports has a width equivalent to 5 to 25% the length of the battery pack case corresponding to the length of the unit cell stack, therefore, it is possible to more efficiently reduce temperature deviation of the coolant caused depending upon device installation conditions. Preferably, each of the coolant inlet ports has a width equivalent to 10 to 20% the length of the battery pack case corresponding to the length of the unit cell stack.

The ends of the battery pack case opposite to the coolant inlet ports may be spaced apart from the top of the unit cell stack by a height equivalent to 10% or less the height of the unit cell stack. This structure appropriately restricts the amount of the coolant reaching the ends of the battery pack case opposite to the coolant inlet ports, thereby further improving uniform distribution of the coolant to the unit cells.

In this case, the ends of the battery pack case opposite to the coolant inlet ports may be spaced apart from the top of the unit cell stack by a height of 1 to 10 mm.

The coolant discharge parts may have the same height with respect to the bottom of the unit cell stack. That is, the bottoms of the coolant discharge parts facing the bottom of the unit cell stack may have the same height as the bottom of the unit cell stack. Alternatively, the structure of each of the coolant discharge parts may be partially changed to improve coolant discharge efficiency.

In accordance with another aspect of the present invention, there is provided a vehicle using the battery pack with the above-stated construction as a power source, having a limited installation space, and exposed to frequent vibration and strong impact.

In a preferred example, the vehicle may be an electric vehicle, a hybrid electric vehicle, or a plug-in hybrid electric vehicle requiring high power and large capacity.

Of course, the battery pack used as the power source of the vehicle may be combined and manufactured based on desired power and capacity.

In this case, the vehicle may be an electric vehicle, a hybrid electric vehicle, or a plug-in hybrid electric vehicle wherein the battery pack is installed in the lower end of a trunk of the vehicle or between a rear seat and the trunk of the vehicle.

The electric vehicle, the hybrid electric vehicle, or the plug-in hybrid electric vehicle using the battery pack as the power source thereof are well known in the art to which the present invention pertains, and therefore, a detailed description thereof will be omitted.

DESCRIPTION OF DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the accompanying drawings. It should be noted, however, that the scope of the present invention is not limited by the illustrated embodiments.

Figure 1:
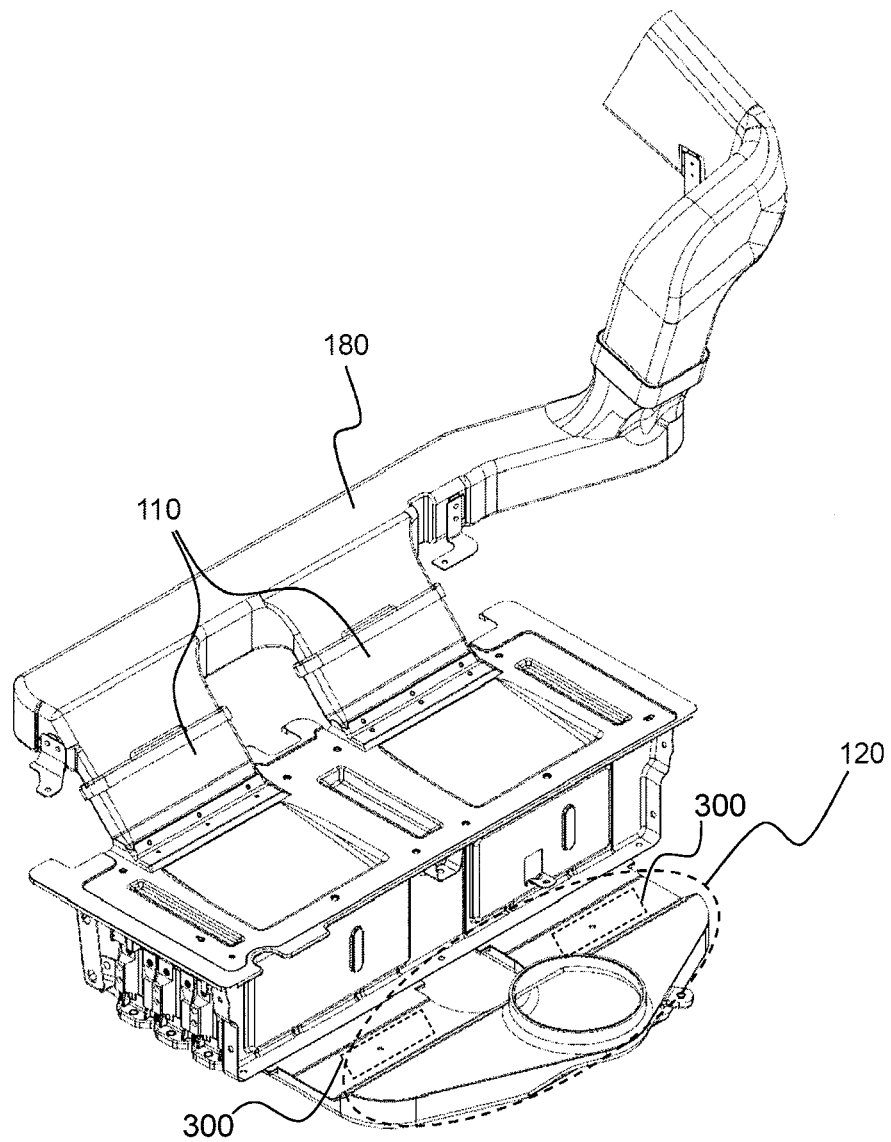
FIG. 1 is a perspective view showing a battery pack according to an embodiment of the present invention.
Figure 2:
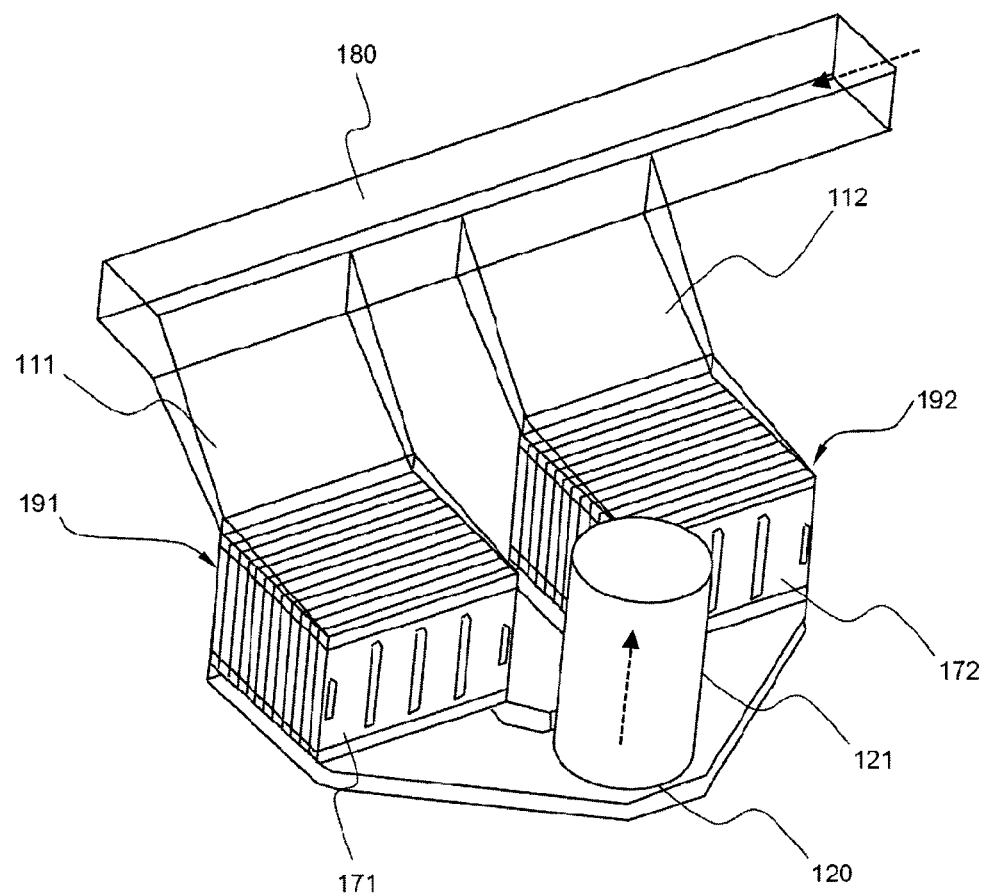
FIG. 2 is a schematic view showing the structure of the battery pack of FIG. 1.
Figure 3:
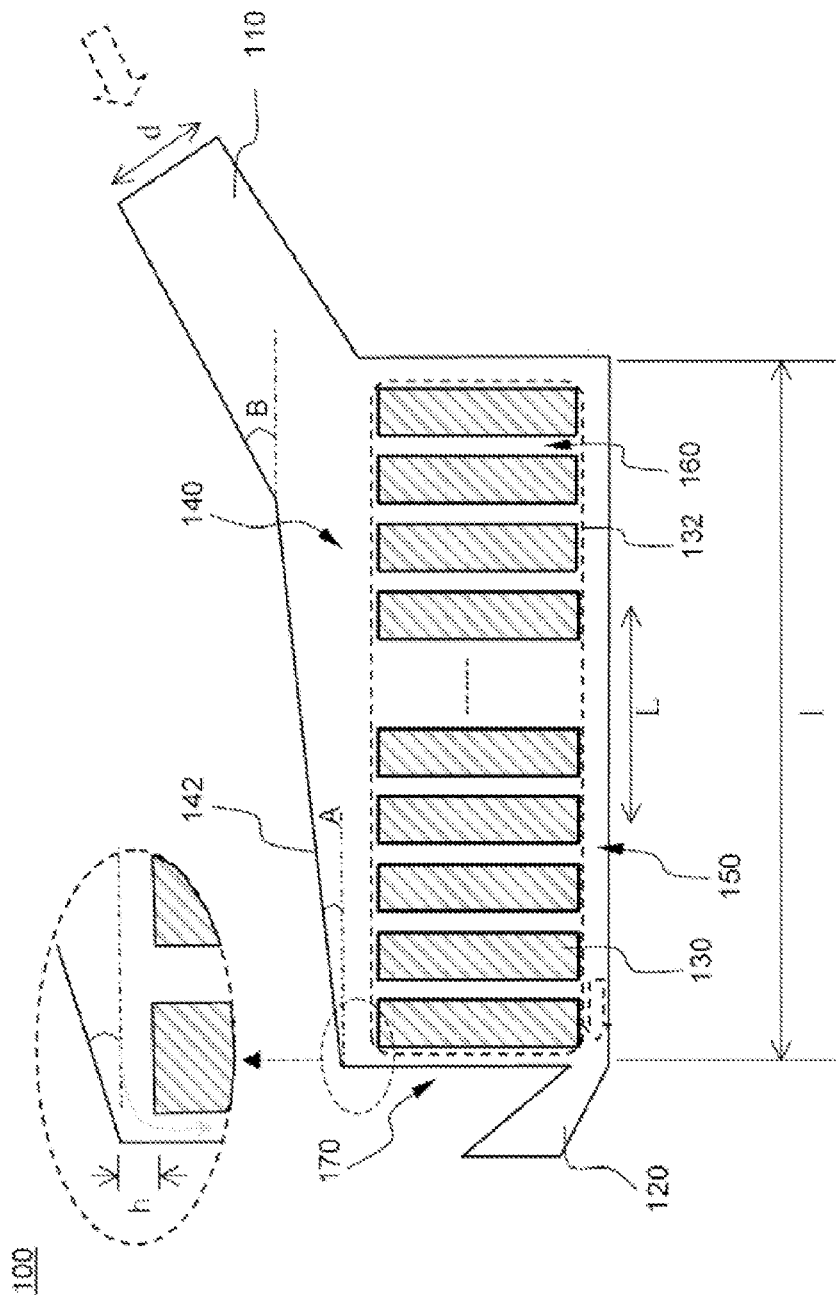
FIG. 3 is a vertical sectional view typically showing a structure in which battery modules of FIG. 1 are mounted in a pack case.

FIG. 1 is a perspective view typically showing a battery pack according to an embodiment of the present invention, FIG. 2 is a schematic view typically showing the structure of the battery pack of FIG. 1, and FIG. 3 is a vertical side sectional view typically showing the battery pack according to the embodiment of the present invention.

Referring to these drawings, a battery pack 100 includes a coolant introduction duct 180, coolant inlet ports 110, battery modules 191 and 192, and coolant outlet ports 120.

The coolant inlet ports 110 diverge from the coolant introduction duct 180 so as to correspond to the respective battery modules 191 and 192 such that the coolant inlet ports 110 are connected to the respective battery modules 191 and 192. Specifically, the respective coolant inlet ports 111 and 112 diverge from the coolant introduction duct 180 at an angle of about 90 degrees to a direction in which a coolant flows in the coolant introduction duct 180 such that the coolant inlet ports 110 are connected to the respective battery modules 191 and 192.

Each of the battery modules 191 and 192 includes a plurality of unit modules 130 stacked in an upright or upside-down fashion. The battery modules 191 and 192 are arranged in two rows in the stacked direction of the unit modules 130. The battery modules 191 and 192 are mounted in pack cases 171 and 172, respectively. The coolant inlet ports 110 and the coolant outlet ports 120 are formed at the upper parts and the lower parts of the pack cases 171 and 172 such that a coolant to cool battery cells flows to one side to the other side of the battery modules 191 and 192 in a direction perpendicular to the stacked direction of the unit modules 130. Also, coolant introduction parts 140, which are flow spaces extending from the coolant inlet ports 111 and 112 to the battery modules 191 and 192, and coolant discharge parts 150, which are flow spaces extending from the battery modules 191 and 192 to the coolant outlet ports 120, are formed at the pack cases 171 and 172.

The coolant outlet ports 120 extend from the respective pack cases such that the coolant outlet ports 120 are connected to a coolant discharge duct 121. In the coolant outlet ports 120 are mounted suction fans 300 to generate driving force, by which the coolant, introduced through the coolant inlet ports 111 and 112, passes the battery modules and is discharged through the coolant outlet ports 120.

The battery modules 191 and 192 will be described in more detail. The coolant inlet ports 110 and the coolant outlet ports 120 are formed at the upper parts and the lower parts of the pack cases 170 of the battery modules 191 and 192 in opposite directions such that a coolant flows to one side to the other side of a battery cell stack 132 in a direction perpendicular to the stacked direction L of the unit modules 130.

Between the respective unit modules 130 are defined small flow channels 160, through which a coolant flows. Consequently, a coolant, introduced through the coolant inlet ports 110, flows through flow channels 160. At this time, the coolant removes heat generated from the unit modules 130. After that, the coolant is discharged out of the pack cases through the coolant outlet ports 120.

An inclination angle B of the coolant inlet ports 110 to the respective pack cases 170 is greater than an inclination angle A of inclined planes starting from ends of the pack case 170 opposite to the respective coolant inlet ports 110.

When a coolant, introduced through the coolant inlet ports 110, flows along the coolant introduction parts 140 having the inclination angle B of the coolant inlet ports 110 and the inclination angle A of the inclined planes, the flow sectional area of the coolant is gradually decreased by the inclination angle A of the inclined planes according to the increase of the distance from the ends of the coolant inlet ports 110. As a result, the flow speed of the coolant is gradually increased but the flow rate of the coolant is decreased, and therefore, the battery cells 130 adjacent to the coolant inlet ports 110 and the battery cells 130 distant from the coolant inlet ports 110 are uniformly cooled while the coolant reaches the battery cells 130 distant from the coolant inlet ports 110.

In order to improve uniformity of the coolant and thus minimize temperature deviation, the inclination angle A of the inclined planes and the inclination angle B of the coolant inlet ports 110 are formed at upper end insides 142 of the respective coolant introduction parts 140 such that the inclination angle A of the inclined planes is about 4 degrees to the top of the battery cell stack 132, and the inclination angle B of the coolant inlet ports 110 is about 20 degrees to the top of the battery cell stack 132. Also, each of the coolant inlet ports has a width d equivalent to about 15% a length l of each of the battery pack cases 170.

Also, the battery pack cases 170 have two inclined structures in which the inclination angle A of the battery pack cases 170 opposite to the coolant inlet ports 110 is less than the inclination angle B of the coolant inlet ports 110. Consequently, it is possible to prevent the occurrence of a phenomenon in which the coolant excessively flows to the coolant outlet ports 120, thereby effectively preventing the increase in temperature of the battery cells adjacent to the coolant inlet ports 110.

The ends of the battery pack cases opposite to the coolant inlet ports is spaced apart from the top of the battery cell stack 132 by a height h of about 1 mm. Consequently, only a limited amount of the coolant, having passed the inclination angle B of the coolant inlet ports 110 and the inclination angle A of the inclined planes, reaches to the ends of battery pack cases opposite to the coolant inlet ports 110, thereby preventing overcooling of the battery cells 130 adjacent to the ends of battery pack cases opposite to the coolant inlet ports 110.

In the above structure, the battery pack is configured to have a compact structure in which the battery pack slightly protrudes in a specific direction, thereby providing high space efficiency. Also, even in a case in which the battery modules 191 and 192 diverge into two rows, temperature deviation between the battery modules 191 and 192 is little.

Figure 4:
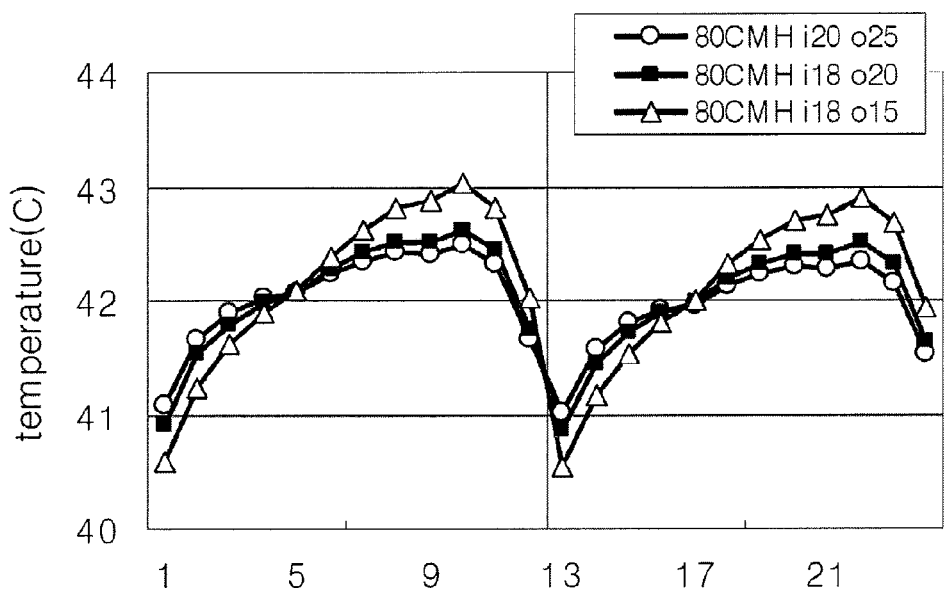
FIG. 4 is a graph showing measurement results of temperature deviation between unit modules of the respective battery modules in the battery pack of FIG. 1.

FIG. 4 is a graph showing measurement results of temperature deviation between the unit modules of the respective battery modules, which are arranged in two rows, in the battery pack of FIG. 1.

Referring to FIG. 4 together with FIG. 2, FIG. 4 shows the measurement results of the temperatures of the battery cells stacked in the pack cases 171 and 172 of FIG. 2 from the battery cell adjacent to the coolant outlet ports 120 to the battery cell adjacent to the coolant inlet ports 110. That is, battery cell number 1 indicates a battery cell in the pack case 171 adjacent to the corresponding coolant outlet port 120, and battery cell number 12 indicates a battery cell in the pack case 171 adjacent to the coolant inlet port 111. Also, battery cell number 13 indicates a battery cell in the pack case 172 adjacent to the corresponding coolant outlet port 120, and battery cell number 24 indicates a battery cell in the pack case 172 adjacent to the coolant inlet port 112.

The temperature measurement experiments were carried out under conditions in which a predetermined load was applied to the battery cells and external temperature was maintained at room temperature. Also, the temperature measurement experiments were carried out under conditions in which the inclination angle B of the coolant inlet ports 111 and 112 was set to 20 degrees as a standard angle, and the inclination angle of the upper end insides 142 of the respective coolant introduction parts was set to 4 degrees as a standard angle. The respective temperature measurement experiments were carried out at an air flow of 80 cubic meter per hour (CMH, cm$^3$/h) under conditions in which the maximum heights of the inlet ports and the outlet ports were 18 mm-15 mm (i18o15), 18 mm-20 mm (i18o20), and 20 mm-25 mm (i20o25). The measurement results revealed that in case of 80 CMH i18o15, the temperature deviation between the battery cells in each of the battery modules was about 2.5° C. but the temperature deviation between the battery modules was little. Also, in case of 80 CMH i18o20 and 80 CMH i20o25, the temperature deviation between the battery cells in each of the battery modules was about 1.5° C. but the temperature deviation between the battery modules was little.

In the above structure, the length of the battery cells in the stacked direction is relatively short as compared with a structure in which the battery cells are arranged in one row. Consequently, the difference between coolant flow distances is reduced, and therefore, the temperature deviation between the battery cells is reduced. Also, the temperature deviation between the battery modules is reduced, and therefore, the overall temperature deviation of the battery pack is reduced.

Figure 5:
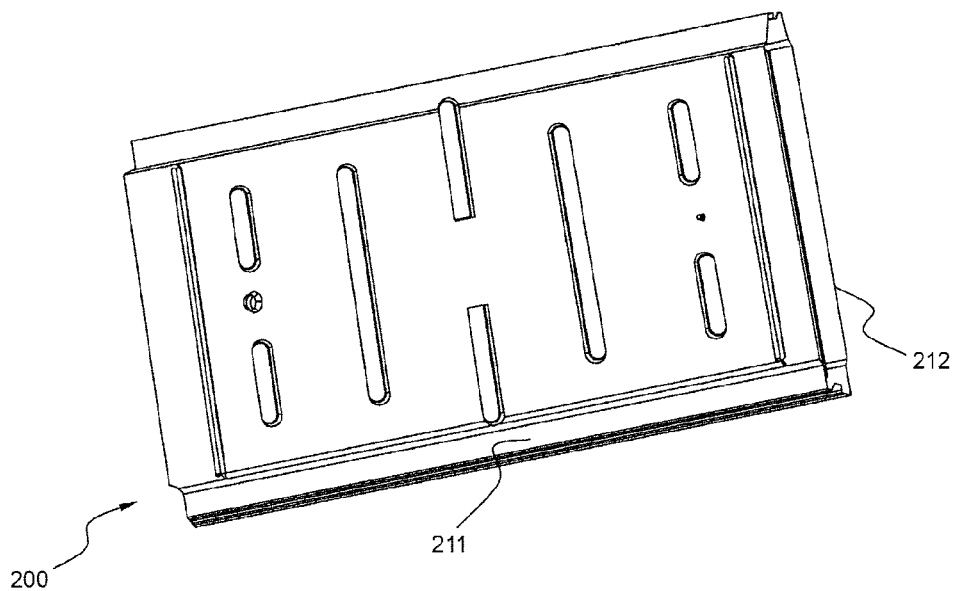
FIG. 5 is a perspective view showing module housings used in a unit module according to an embodiment of the present invention.

FIG. 5 is a perspective view typically showing module housings used in a unit module according to an embodiment of the present invention.

Referring to FIG. 5, there is shown a pair of high strength module housings 200 configured to fully cover the outside of a battery cell stack 500. The module housings 200 restrain the repetitive expansion and contraction change of the battery cells during the charge and discharge of the battery cells, while protecting the battery cells having low mechanical strength, thereby preventing separation between sealed regions of the battery cells. The module housings 200 include a left housing 211 and a right housing 212. The left housing 211 and the right housing 212 may be coupled to each other without additional fastening members. At the middle of one side of each of the module housings 200 is attached a thermistor (not shown), which is connected to an external connector (not shown) via a cable.

Figure 6:
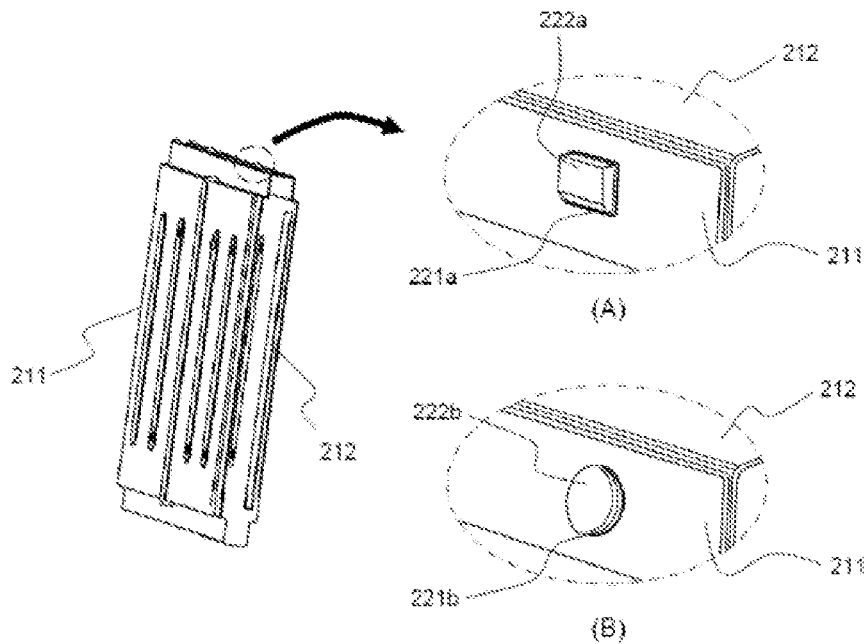
FIG. 6 is a perspective view showing a coupling structure of the module housings used in the unit module according to the embodiment of the present invention.

FIG. 6 is a partially enlarged view showing a coupling structure of the module housings.

Referring to FIG. 6, the module housings 211 and 212 are configured to have bent structures 221a, 222a, 221b, and 222b corresponding to each other in vertical section such that the module housings 211 and 212 are engaged with each other through elastic coupling when the module housings 211 and 212 are pushed in a state in which the module housings 211 and 212 are in contact with each other such that the module housings 211 and 212 face each other. The bent structures may be quadrangular or circular structures. Consequently, strong mechanical coupling between the module housings 211 and 212 is achieved without the provision of additional coupling members or performance of a processing process. This simple and easy coupling structure is preferably applied to mass production.

Figure 7:
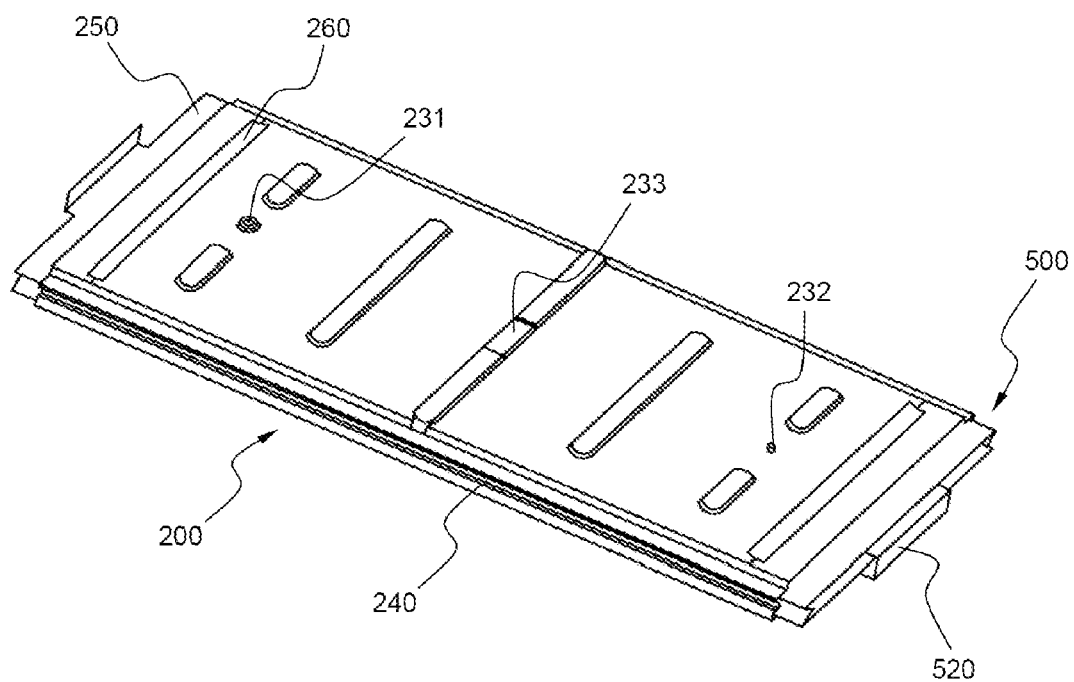
FIG. 7 is a perspective view showing a unit module according to an embodiment of the present invention.

FIG. 7 is a perspective view showing a unit module according to an embodiment of the present invention.

Referring to FIG. 7, a pair of module housings 200 are mounted to the outside of the battery cell stack 500, which is folded in an overlap fashion, to complement low mechanical characteristics of the battery cells. One-side electrode terminals 520 of the battery cells are coupled to each other by welding such that the electrode terminals 520 of the battery cells are bent in a '[' shape, and the other-side electrode terminals 520 of the battery cells are bent outward such that the other-side electrode terminals 520 of the battery cells are bent outward such that the other-side electrode terminals 520 of the battery cells are coupled to other battery modules stacked at the opposite sides thereof.

The module housings 200 are made of a pair of high strength metal sheets coupled to each other to cover the entire outside of the battery cell stack excluding the electrode terminals of the battery cell stack. At the sides of the module housings 200 adjacent to the left and right ends thereof are formed steps 240 to easily fix the module. At the upper and lower end of the module housings 200 are formed steps 250 having the same function. Also, longitudinal fixing parts 260 are formed at the upper and lower end of the module housings 200 to easily fix the module. At the outsides of the module housings 200 are formed linear protrusions, which are spaced apart from each other in the lateral direction. At the middle protrusions are formed depressions 233, in which thermistors are mounted. At the upper and lower end linear protrusions are formed protrusions 231 and 232, which are configured to have opposite shapes.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

[Industrial Applicability]

As is apparent from the above description, a battery pack according to the present invention includes battery modules arranged in two or more rows. Consequently, it is possible to more efficiently utilize a space, thereby minimizing a dead space in a vehicle in a case in which the battery pack is installed in the vehicle.

Also, the temperature deviation between battery cells of each of the battery modules is kept little while the battery pack according to the present invention has a structure to independently cool the battery modules.

The invention claimed is:

1. A battery pack comprising
   battery modules arranged in two or more rows,
   each of the battery modules comprising a plurality of stacked battery cells or unit modules, each of which has two or more battery cells mounted therein,
   wherein the battery modules which are arranged in the two or more rows in the stacked direction of the battery cells or the unit modules are individually mounted in pack cases,
   each pack case is provided at an upper part and a lower part thereof with a coolant inlet port and a coolant outlet port, respectively, such that a coolant to cool the battery cells flows from one side to another side of the corresponding battery module in a direction perpendicular to the stacked direction of the battery cells or the unit modules,
   each pack case is further provided a coolant introduction part extending from the coolant inlet port to the corresponding battery module, and a coolant discharge part extending from the corresponding battery module to the coolant outlet port,
   the coolant inlet ports diverge from a coolant introduction duct such that the coolant inlet ports are connected to the respective pack cases while the coolant outlet ports extend from the respective pack cases such that the coolant outlet ports are connected to a coolant discharge duct, the coolant inlet ports diverge from the coolant introduction duct at an angle of 60 to 120 degrees to a direction in which the coolant flows in the coolant introduction duct,
   the coolant discharge duct is formed at a place at which the coolant outlet ports are connected to each other such that the coolant discharge duct extends upward along sides of the battery modules, and
   suction fans to generate driving force, by which the coolant, introduced through the coolant inlet ports, passes the battery modules and is discharged through the coolant outlet ports, are mounted in the coolant outlet ports.

2. The battery pack according to claim 1, wherein the coolant inlet ports diverge from the coolant introduction duct at an angle of 90 degrees to the direction in which the coolant flows in the coolant introduction duct.

3. The battery pack according to claim 1, wherein each of the coolant inlet ports has a width equivalent to 5 to 25% a length of the pack case corresponding to a length of the stacked battery cells or unit modules measured in the stacked direction.

4. The battery pack according to claim 1, wherein the coolant discharge parts have the same height with respect to a bottom of the stacked battery cells or unit modules.

5. The battery pack according to claim 1, wherein each of the unit modules is configured to have a structure comprising the two or more battery cells, electrode terminals of which are connected in series to each other, and a pair of module housings coupled to cover outsides of the battery cells excluding the electrode terminals of the battery cells.

6. The battery pack according to claim 5, wherein each of the unit modules is configured to have a structure in which two battery cells are mounted in the module housings made of a metallic material.

7. The battery pack according to claim 1, wherein upper end insides of the coolant introduction parts have inclined planes inclined with respect to a top of each of the stacked battery cells or unit modules such that the coolant introduction parts are widened from ends of the pack case opposite to the coolant inlet ports to the coolant inlet ports, the top being a surface that is spaced furthest from the coolant outlet ports.

8. The battery pack according to claim 7, wherein each of the inclined planes has an inclination angle of 3 to 8 degrees.

9. The battery pack according to claim 7, wherein the ends of the pack case opposite to the coolant inlet ports are spaced apart from the top of the stacked battery cells or unit modules by a height equivalent to 10% or less a height of the stacked battery cells or unit modules measured perpendicular to the stacked direction.

10. The battery pack according to claim 9, wherein the height is 1 to 10 mm.

11. A vehicle comprising a battery pack according to claim 1 as a power source.

12. The vehicle according to claim 11, wherein the vehicle is an electric vehicle, a hybrid electric vehicle, or a plug-in hybrid electric vehicle.

* * * * *